(12) United States Patent
Shimada

(10) Patent No.: US 8,612,661 B2
(45) Date of Patent: Dec. 17, 2013

(54) INTERRUPT-NOTIFICATION CONTROL UNIT, SEMICONDUCTOR INTEGRATED CIRCUIT AND METHODS THEREFOR

(75) Inventor: Takashi Shimada, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 241 days.

(21) Appl. No.: 12/770,224

(22) Filed: Apr. 29, 2010

(65) Prior Publication Data

US 2010/0306433 A1   Dec. 2, 2010

(30) Foreign Application Priority Data

May 26, 2009   (JP) .................................. 2009-126534

(51) Int. Cl.
*G06F 13/24*   (2006.01)

(52) U.S. Cl.
USPC ............................ 710/264; 710/260; 710/262

(58) Field of Classification Search
USPC ................................................ 710/260–269
See application file for complete search history.

(56) References Cited

U.S. PATENT DOCUMENTS

| | | | | |
|---|---|---|---|---|
| 5,708,814 A * | 1/1998 | Short et al. | | 710/260 |
| 5,937,199 A * | 8/1999 | Temple | | 710/262 |
| 6,189,066 B1 * | 2/2001 | Lowe et al. | | 710/260 |
| 6,889,277 B2 * | 5/2005 | Musumeci | | 710/260 |
| 6,889,279 B2 * | 5/2005 | Godfrey | | 710/269 |
| 6,895,460 B2 * | 5/2005 | Desoli et al. | | 710/262 |
| 7,478,186 B1 * | 1/2009 | Onufryk et al. | | 710/263 |
| 7,587,587 B2 * | 9/2009 | Buer et al. | | 713/153 |
| 7,743,193 B2 * | 6/2010 | Hwang | | 710/260 |
| 7,788,434 B2 * | 8/2010 | Pesavento et al. | | 710/262 |
| 7,788,435 B2 * | 8/2010 | Worthington et al. | | 710/263 |
| 2007/0143513 A1 * | 6/2007 | Wang et al. | | 710/260 |
| 2008/0235424 A1 * | 9/2008 | Lee et al. | | 710/260 |

FOREIGN PATENT DOCUMENTS

| | | |
|---|---|---|
| JP | 2-153433 | 6/1990 |
| JP | 7-168723 | 7/1995 |
| JP | 2000-322270 | 11/2000 |
| JP | 2001-14243 | 1/2001 |
| JP | 2002-182930 | 6/2002 |
| JP | 2004-118546 | 4/2004 |
| JP | 2005-242467 | 9/2005 |
| JP | 2008-217821 | 9/2008 |

OTHER PUBLICATIONS

"Effects of Interrupt Coalescence on Network Measurements"—College of Computing, Georgia Tech; 10 pages, No Date Provided.*
Japanese Notification of Reason for Refusal dated Jan. 22, 2013, issued in corresponding Japanese Patent Application No. 2009-126534.

* cited by examiner

*Primary Examiner* — Brian Misiura
(74) *Attorney, Agent, or Firm* — Staas & Halsey LLP

(57) ABSTRACT

An interrupt-notification control unit that receives interrupt requests from a plurality of interrupt dispatchers and sends the received interrupt requests together to a processor, where the interrupt-notification control unit determines a correlation among the interrupt requests to control a time to send the interrupt requests together to the processor.

14 Claims, 10 Drawing Sheets

INTERRUPT-NOTIFICATION CONTROL UNIT, SEMICONDUCTOR INTEGRATED CIRCUIT AND METHODS THEREFOR

CROSS-REFERENCE TO RELATED APPLICATIONS

This application is based upon and claims the benefit of priority from the prior Japanese Patent Application No. 2009-126534 filed on May 26, 2009, the entire contents of which are incorporated herein by reference.

BACKGROUND

Embodiments described herein relate to an interrupt-notification control unit and a semiconductor integrated circuit, and methods therefor.

FIELD

A technology called interrupt coalescing is well known in computer systems.

Generally, interrupt coalescing may be applied to an interrupt-notification control unit (interrupt controller) that connects an interrupt dispatcher that issues an interrupt request and a processor having an interrupt input terminal.

The basic concept of the interrupt coalescing is to prevent an increase in load on the processor due to a high frequency of interrupts.

The interrupt coalescing reduces overhead of the processor associated with interrupt handling, such as starting/stopping an interrupt handler, by delaying the time of sending an interrupt request to the processor under fixed conditions and sending the request to the processor together with a plurality of interrupt requests issued later.

FIG. 1 is a schematic block diagram of an example of a typical interrupt-notification control unit, schematically representing an interrupt controller incorporating basic interrupt coalescing. FIG. 2 is a conceptual block diagram of a delay control unit in the interrupt-notification control unit in FIG. 1.

In FIG. 1, the reference numeral 501 denotes an interrupt controller (interrupt-notification control unit), 502 denotes a processor, and 503 denotes an interrupt dispatcher. In FIG. 2, reference numeral 511a denotes a delay limit counter, and 511b denotes an AND gate.

As illustrated in FIG. 1, the interrupt controller 501 includes a delay control unit 511 and a condition register 512.

Assume that, in the interrupt controller 501 illustrated in FIG. 1, a condition (interrupt delay condition) in the condition register 512 is "delay a notification until X interrupt requests are issued".

At that time, the number of times "X" is held in the condition register 512. When the delay limit counter 511a in the delay control unit 511 counts X times of interrupt notification (interrupt request) IR from the interrupt dispatcher 503, a high level "1" is output to the AND gate 511b.

Thus, the AND gate 511b sends the X times of previous interrupt request IR to the processor 502 at the time of high level "1" due to the X-th interrupt request.

FIG. 2 illustrates the concept of the delay control unit 511, in which a latch circuit or the like for holding X times of interrupt request IR from the interrupt dispatcher 503 is practically provided.

Specifically, the delay control unit 511 delays interrupt notification to the processor 502 during the time after the first interrupt request IRS is issued from the interrupt dispatcher 503 until X times of interrupt request are issued. At the point where the X-th interrupt request is issued, the delay control unit 511 sends the X interrupt requests together to the processor 502.

The use of this method may substantially reduce the number of times of interrupt to processor 502 to 1/X, thereby reducing overhead associated with interrupt handling.

Various modifications of interrupt coalescing have been proposed in the related art; Japanese Laid-open Patent Publication Nos. 2008-217821 and 2002-182930 describe typical methods for delaying the time at which a plurality of interrupt requests are sent.

SUMMARY

According to an aspect of the embodiment, an interrupt-notification control unit that receives interrupt requests from a plurality of interrupt dispatchers and sends the received interrupt requests together to a processor, where the interrupt-notification control unit determines a correlation among the interrupt requests to control time to send the interrupt requests together to the processor.

An embodiment is directed to a method of controlling an interrupt request including determining a correlation among interrupt requests to control a time to send the interrupt requests collectively to a processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
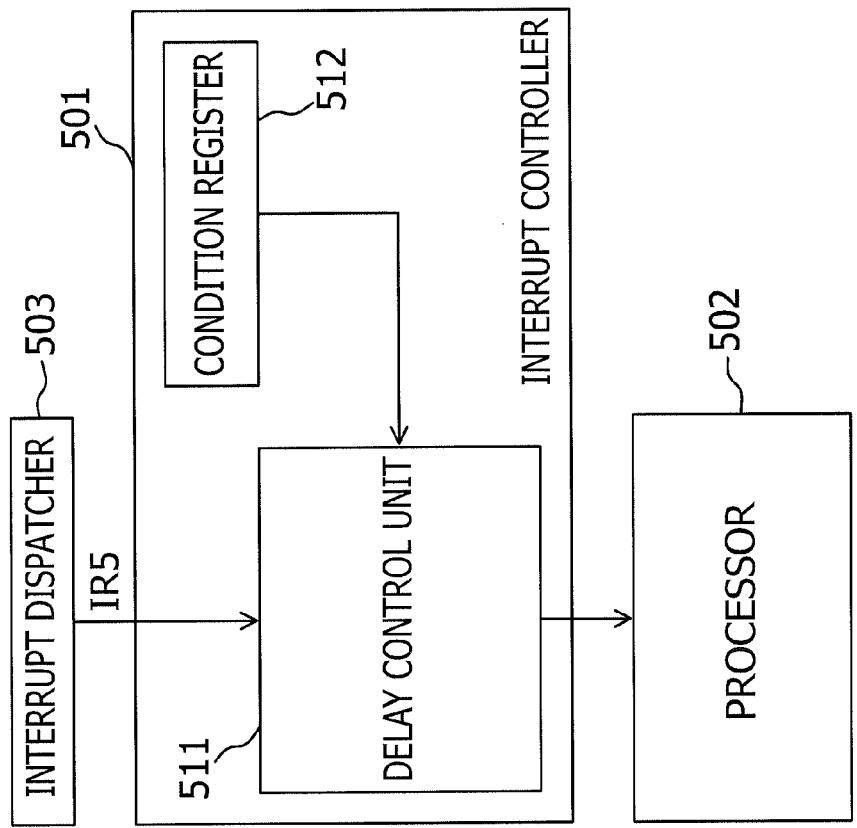
FIG. 1 is a schematic block diagram of an example of a typical interrupt-notification control unit.

Reference will now be made in detail to the embodiments, examples of which are illustrated in the accompanying drawings, wherein like reference numerals refer to the like elements throughout. The embodiments are described below to explain the present invention by referring to the figures.

First, before description of embodiments of an interrupt-notification control unit and a semiconductor integrated circuit, problems in applying the typical interrupt coalescing technology to an interrupt controller for a plurality of interrupt dispatchers without change will be described.

Figure 3:
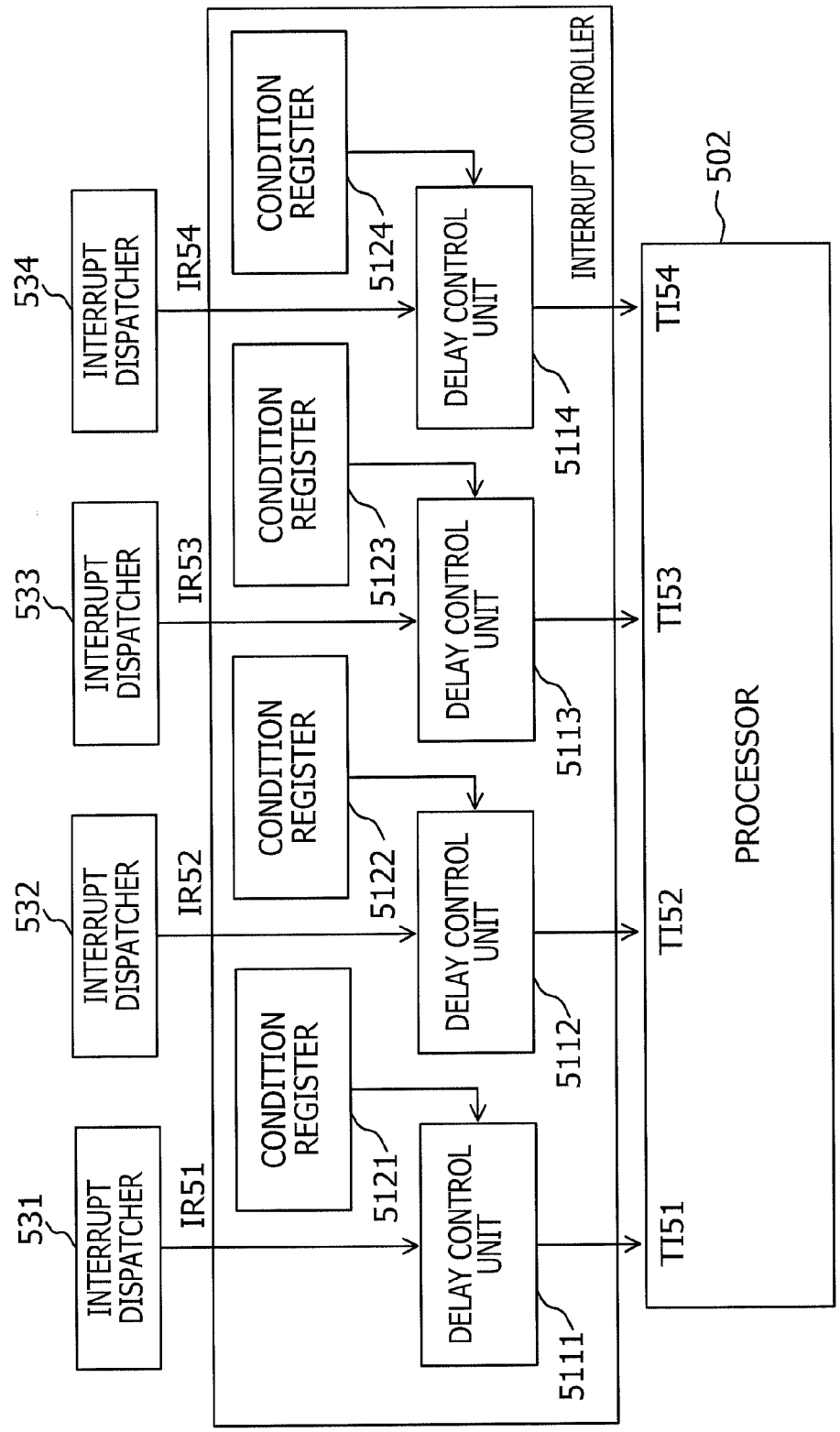
FIG. 3 is a schematic block diagram of an example of an interrupt-notification control unit for a plurality of interrupt dispatchers.

FIG. 3 is a schematic block diagram of an example of the interrupt-notification control unit for a plurality of interrupt dispatchers; specifically, an interrupt controller 501 for four interrupt dispatchers 531, 532, 533 and 534.

Interrupt requests IR51, IR52, IR53 and IR54 from the interrupt dispatchers 531, 532, 533 and 534 may be input by various means, for example, a keyboard, a mouse, another peripheral device, the host, or software.

As illustrated in FIG. 3, the interrupt controller 501 includes four pairs of delay control units 5111, 5112, 5113 and 5114 and condition registers 5121, 5122, 5123 and 5124 corresponding to the four interrupt dispatchers 531, 532, 533 and 534.

In other words, the interrupt controller 501 is provided with four pairs of the delay control unit 511 and the condition register 512, illustrated in FIG. 1, corresponding to the four interrupt dispatchers 531, 532, 533 and 534. The delay control units 5111, 5112, 5113 and 5114 a may be similar as the delay control unit 511 illustrated in FIG. 2.

Generally, the method of interrupt coalescing has problems when applied to the interrupt controller 501 that connects the plurality of interrupt dispatchers 531, 532, 533 and 534 and a processor 502 having a plurality of interrupt input terminals TI51, TI52, TI53 and TI54, because this method determines notification delay conditions for individual interrupt dispatchers.

That is, the interrupt coalescing may not determine the delay conditions in connection with information, such as a status of the interrupt requests IR51, IR52, IR53 and IR54 from the interrupt dispatchers 531, 532, 533 and 534 or priority levels (necessity, for example, for a real-time processing) of the interrupt requests IR51, IR52, IR53 and IR54.

This therefore hinders time delay considering a correlation among the interrupt requests IR51, IR52, IR53 and IR54, thus preventing appropriate handling, for example, when the plurality of interrupt dispatchers 531, 532, 533 and 534 issue the interrupt requests IR51, IR52, IR53 and IR54 to the processor 502 at the same time.

Specifically, for example, if a fixed time, which is a delay condition for the interrupt requests IR51, IR52, IR53 and IR54, has not passed, the interrupt requests IR51, IR52, IR53 and IR54 may not be quickly sent together to the processor 502.

For example, if the plurality of interrupt dispatchers 531, 532, 533 and 534 issue the interrupt requests IR51, IR52, IR53 and IR54, whose priority levels are low, to the processor 502 at the same time, flexible handling, such as delaying interrupt notification to the of processor 502, may not be provided.

Furthermore, direct use of values in condition registers 5121, 5122, 5123 and 5124 as values for determining delay conditions results in delaying interrupt requests IR51, IR52, IR53 and IR54 always in accordance with a fixed condition because the values are fixed.

This always delays responses to the occurrence of interrupt requests by a fixed time; thus, this process is not suitable for the interrupt controller 501 that connects the plurality of interrupt dispatchers 531, 532, 533 and 534 and the processor 502 having the plurality of interrupt input terminals TI51, TI52, TI53 and TI54.

Figure 4:
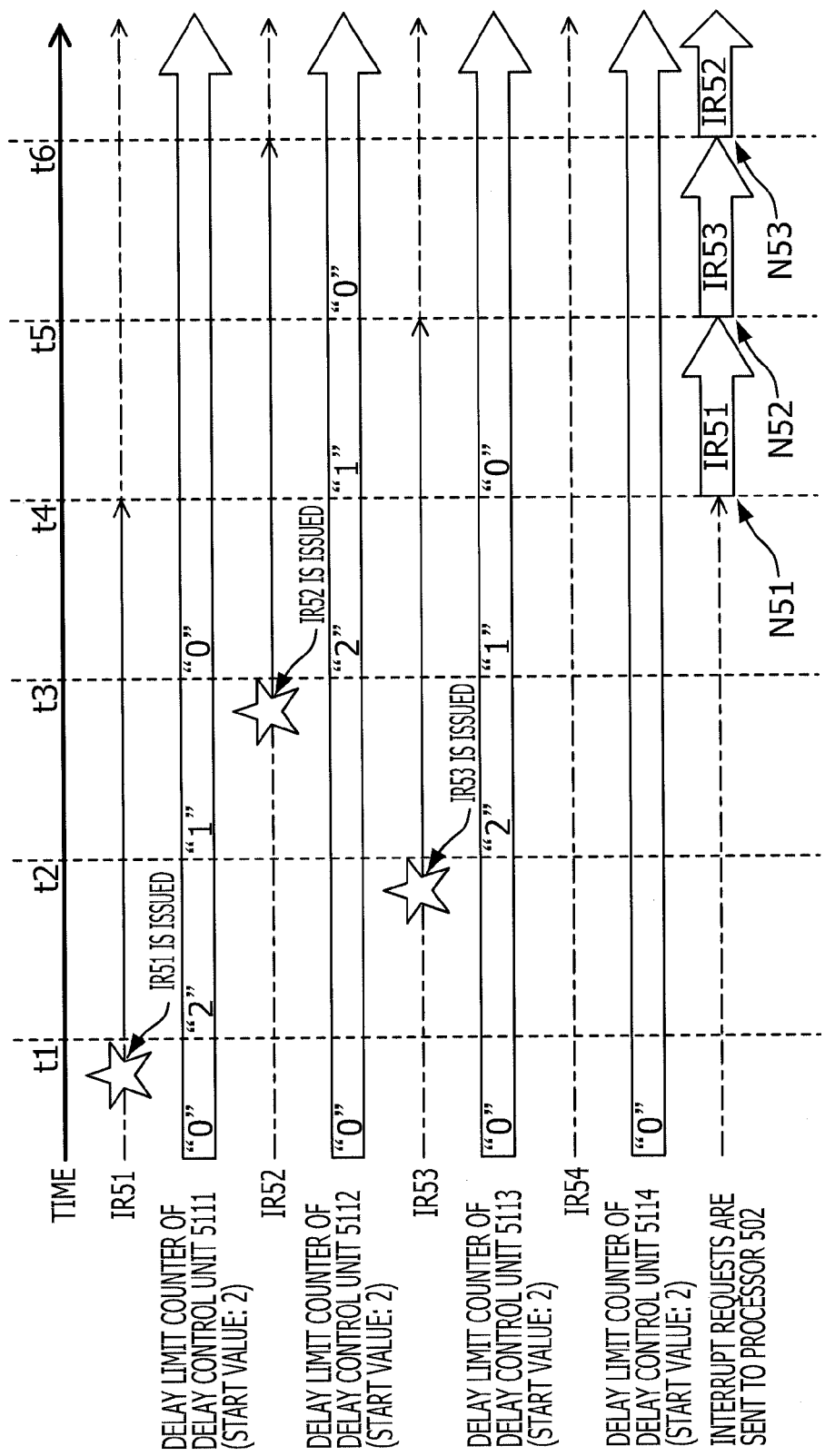
FIG. 4 is a timing chart for describing an example of an operation of the interrupt-notification control unit illustrated in FIG. 3.

FIG. 4 is a timing chart for describing an example of an operation of the interrupt controller 501 illustrated in FIG. 3.

In the example of FIG. 4, the interrupt request IR51 is issued from the interrupt dispatcher 531 at time t1, the interrupt request IR53 is issued from the interrupt dispatcher 533 at time t2, and the interrupt request IR52 is issued from the interrupt dispatcher 532 at time t3.

The delay control units 5111, 5112, 5113 and 5114 to which the interrupt requests R51, R52, R53 and R54 from the interrupt dispatchers 531, 532, 533 and 534 are input, respectively, are each provided with a delay limit counter (511a in FIG. 2) with a start value of 2. When the delay limit counter reaches 0, the interrupt requests R51, R52, R53 and R54 are sent to processor 502.

In other words, even if the interrupt request IR51 is issued from the interrupt dispatcher 531 at time t1, the interrupt request IR53 is issued from the interrupt dispatcher 533 at time t2, and the interrupt request IR52 is issued from the interrupt dispatcher 532 at time t3, the interrupt requests IR51, IR52, IR53 and IR53 are not sent to the processor 502 at time t3.

The interrupt request IR51 is sent to the processor 502 at time t4 when the delay limit counter in the delay control unit 5111 reaches 0, as indicated by reference sign N51. The interrupt request IR53 is sent to the processor 502 at time t5 when the delay limit counter in the delay control unit 5113 reaches 0, as indicated by reference sign N52.

The interrupt request IR52 is sent to the processor 502 at time t6 when the delay limit counter in the delay control unit 5112 reaches 0, as indicated by reference sign N53.

Thus, the interrupt controller 501 illustrated in FIG. 3 sends the interrupt requests IR51, IR53, and IR52 at three times t4, t5, and t6 merely in accordance with the values of the delay limit counters in the delay control units 5111, 5112 and 5113, without consideration of a correlation among the interrupt requests IR51, IR52, IR53 and IR53 from the interrupt dispatchers 531, 532 and 533.

In other words, even if three interrupt requests IR51, IR53, and IR52 are issued at continuous three times, t1, t2, and t3, the interrupt controller 501 merely handles the interrupt requests IR51, IR53, and IR52 from the three different interrupt dispatchers 531, 532 and 533 and does not handle the plurality of interrupt requests IR51, IR53, and IR52 collectively.

This results in need for three times of starting/stopping the interrupt handler for the three different times of interrupt requests IR51, IR53, and IR52, thus increasing overhead due to interrupt handling.

An interrupt-notification control unit and a semiconductor integrated circuit according to an embodiment will be described hereinbelow with reference to the attached drawings.

Figure 5:
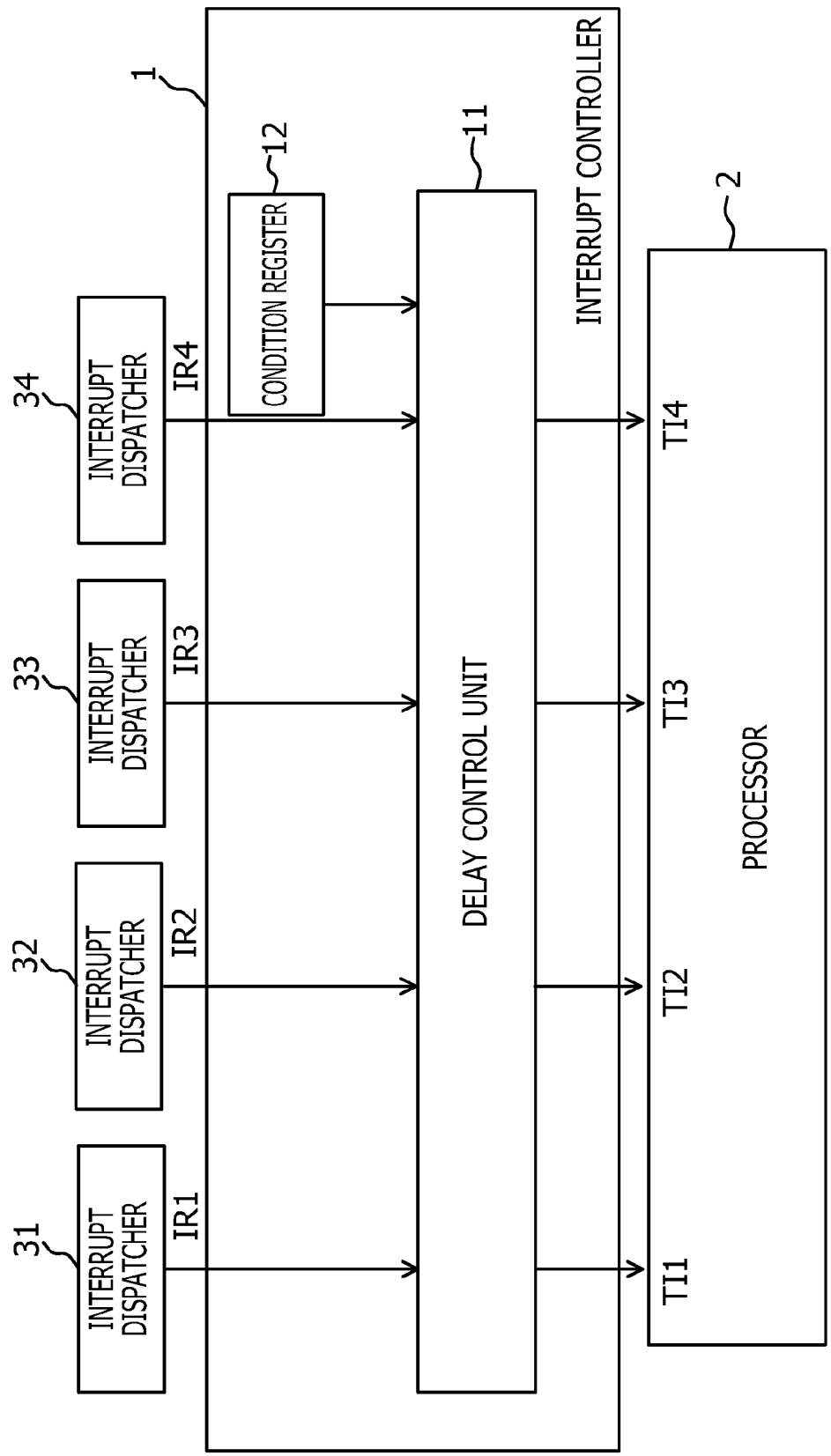
FIG. 5 is a schematic block diagram of an interrupt-notification control unit according to an embodiment.

FIG. 5 is a schematic block diagram of an interrupt-notification control unit (interrupt controller) according to an embodiment, specifically illustrating an interrupt controller 1 for four interrupt dispatchers 31, 32, 33 and 34.

Interrupt requests IR51, IR52, IR53 and IR54 from the interrupt dispatchers 31, 32, 33 and 34 are input by various means, for example, a keyboard, a mouse, another peripheral device, the host, or software.

As illustrated in FIG. 5, the interrupt controller 1 of an embodiment includes one delay control unit 11 and one condition register 12 common to the four interrupt dispatchers 31, 32, 33 and 34. While FIG. 5 illustrates four interrupt dispatchers, the invention is not limited to any particular number of interrupt dispatchers. Further, varying number of components may be provided as part of the interrupt-notification control unit illustrated in FIG. 5.

The delay control unit 11 determines a correlation among the interrupt requests IR1, IR2, IR3 and IR4 from the interrupt dispatchers 31, 32, 33 and 34 and controls the delay of time to send the interrupt requests IR1, IR2, IR3 and IR4 together to a processor 2.

In other words, the delay control unit 11 uses a state of notification of a single interrupt request with time and a state of another interrupt request at the same time as the reference of delay conditions, in correlation with the state of notification of interrupts to a plurality of interrupt input terminals TI1, TI2, TI3 and TI4 of the processor 2.

Figure 6:
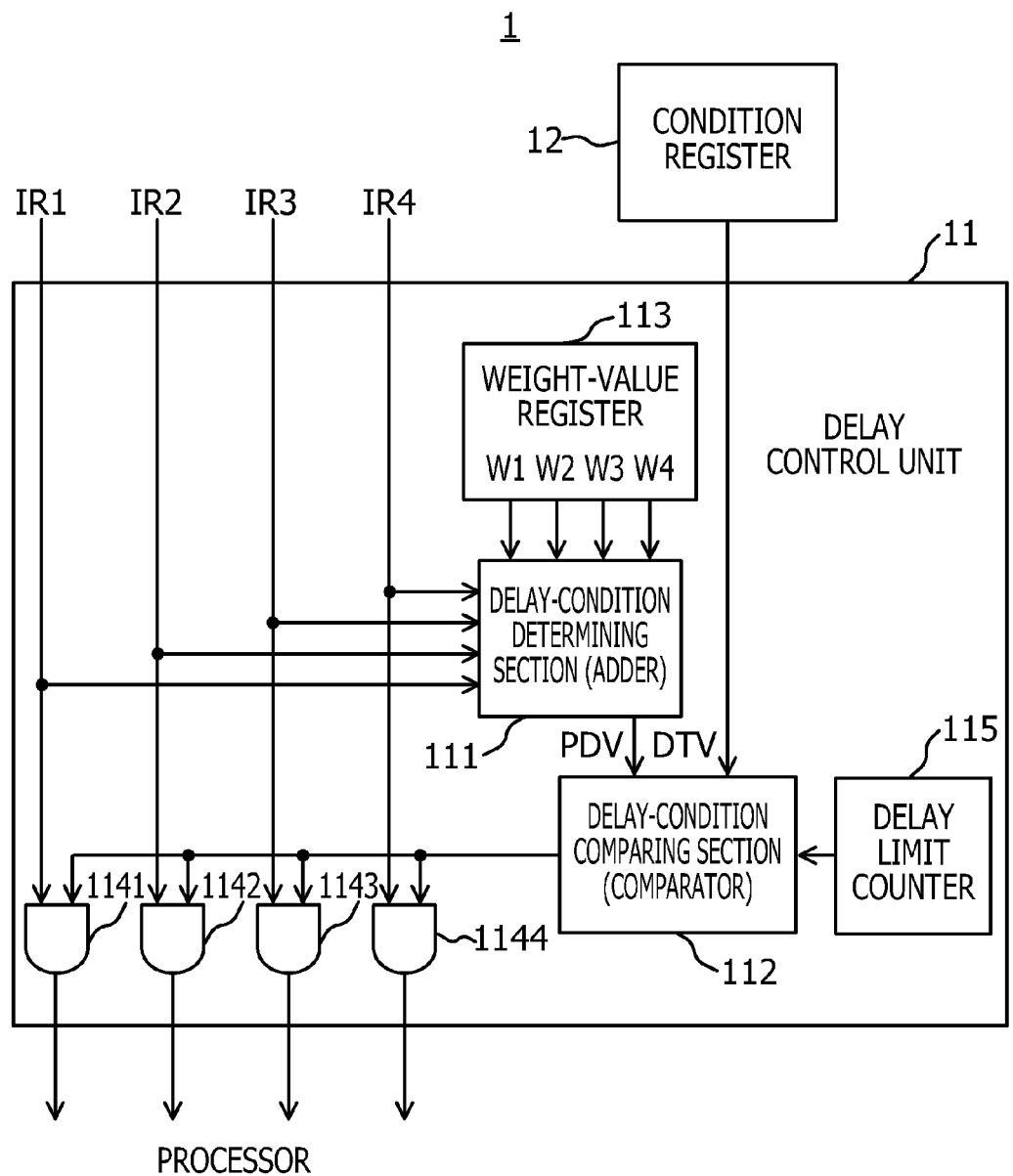
FIG. 6 is a schematic block diagram of a delay control unit in the interrupt-notification control unit in FIG. 5.

FIG. 6 is a schematic block diagram of the delay control unit 11 in the interrupt controller 1 in FIG. 5.

As illustrated in FIG. 6, the delay control unit 11 includes a delay-condition determining section (adder) 111, a delay-condition comparing section (comparator) 112, a weight-value register 113, AND gates 1141, 1142, 1143 and 1144, and a delay limit counter 115.

A weight-value register 113 stores weight values given to the individual interrupt requests IR1, IR2, IR3 and IR4. The delay-condition determining section 111 calculates weight values given to the interrupt requests IR1, IR2, IR3 and IR4 to obtain a provisional delay condition value PDV.

Here, the weight values given to the individual interrupt requests IR1, IR2, IR3 and IR4 are determined on the basis of the priority levels of interrupt dispatchers 31, 32, 33 and 34 that issue the interrupt requests IR1, IR2, IR3 and IR4. Specifically, a large weight value is set for an interrupt request from a high-priority interrupt dispatcher, and in contrast, a small weight value is set for an interrupt request from a low-priority interrupt dispatcher.

The condition register 12 stores a delay condition threshold value DTV to be compared by the delay-condition comparing section 112 with the provisional delay condition value PDV calculated by the delay-condition determining section 111. The AND gates 1141, 1142, 1143 and 1144 control notification of interrupt requests IR1, IR2, IR3 and IR4 to the processor 2 in accordance with a comparison result of the delay-condition comparing section 112.

The delay limit counter 115 is for sending interrupt requests together to the processor 2 when the delay limit counter 115 reaches a predetermined value irrespective of the comparison result of the delay-condition comparing section 112.

For example, in the case where the priority levels of all issued interrupt requests are low, so that it takes a long time to compare the provisional delay condition value PDV and the delay condition threshold value DTV by the delay-condition comparing section 112, the previous interrupt requests are sent to the processor 2 after a predetermined time of counting.

This allows even a low-priority interrupt request (with a small weight value) to be sent to the processor 2 after the predetermined time of counting by the delay limit counter 115, thus preventing interrupt handling from being delayed for a long time.

Referring to FIG. 6, the interrupt requests IR1, IR2, IR3 and IR4 are directly input to one inputs of the AND gates 1141, 1142, 1143 and 1144 and are ANDed with output signals from the delay-condition comparing section 112 input to the other inputs.

However, it is needless to say that the delay control unit 11 is practically provided with a latch circuit or the like for holding the interrupt requests IR1, IR2, IR3 and IR4.

Figure 7:
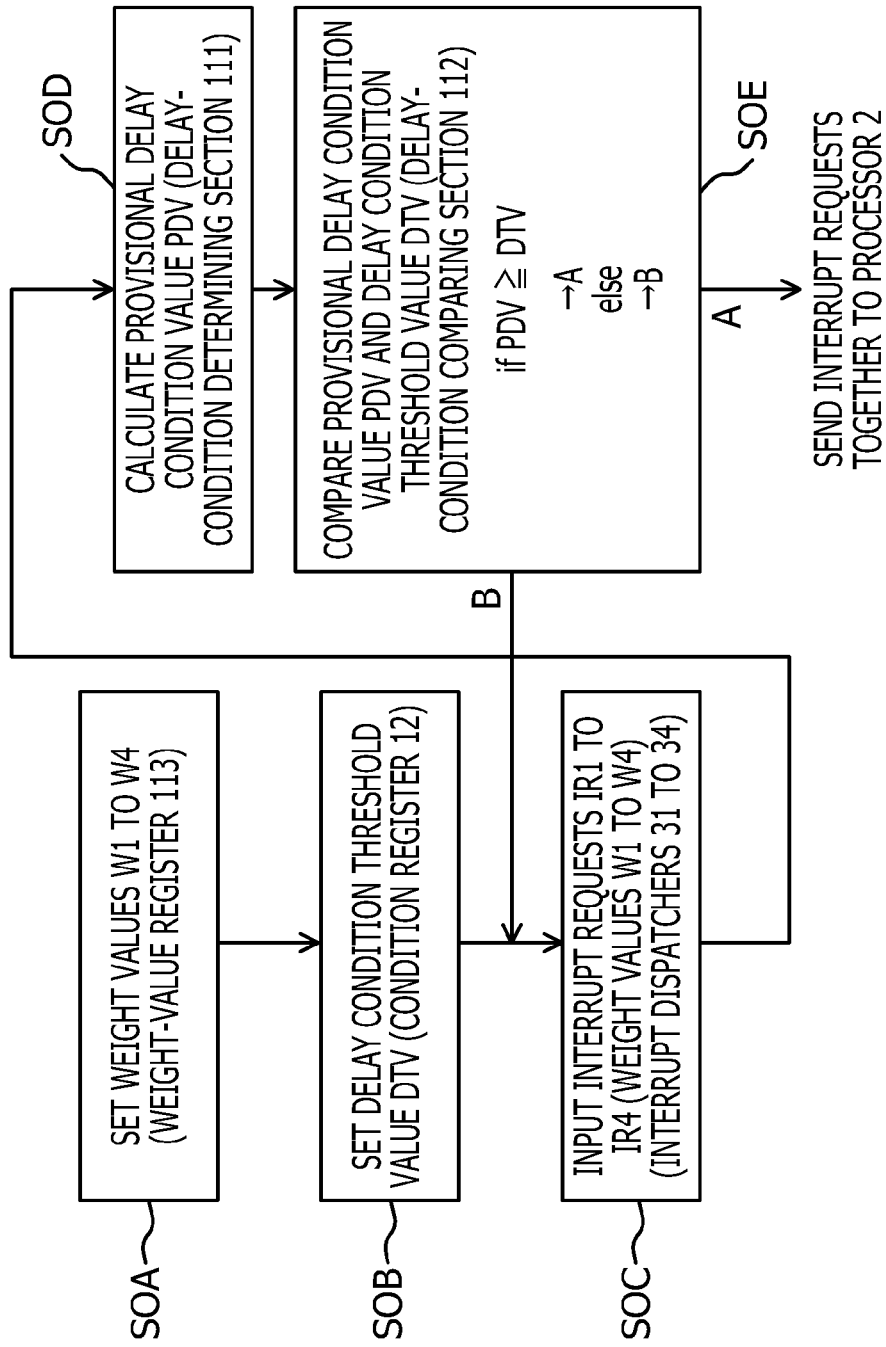
FIG. 7 is a diagram for describing an example of handling by the delay control unit shown in FIG. 6.

FIG. 7 is a diagram for describing an example of handling by the delay control unit 11 illustrated in FIG. 6.

As illustrated in FIG. 7, first, in operation SOA, weight values W1, W2, W3 and W4 (W1 to W4) are set in the weight-value register 113.

The weight values W1, W2, W3 and W4 are set on the basis of the priority levels of the interrupt dispatchers 31, 32, 33 and 34 that issue the interrupt requests IR1, IR2, IR3 and IR4 by means of, for example, software from the outside.

The weight values W1, W2, W3 and W4 given to the interrupt requests IR1, IR2, IR3 and IR4, respectively, correspond to, for example, the priority levels of interrupt input terminals of the interrupt controller 1.

In other words, an interrupt request (for example, IR2) from a high-priority interrupt dispatcher (for example, an interrupt dispatcher 32) has a high necessity for a real-time interrupt response. This corresponds to a large weight value for delaying notification (for example, W2=4).

In contrast, an interrupt request (for example, IR3) from a low-priority interrupt dispatcher (for example, an interrupt dispatcher 33) has a low necessity for a real-time interrupt response. This corresponds to a small weight value for delaying notification (for example, W3=1).

The weight values W1, W2, W3 and W4 may be set to any values. The sum total of the weight values of the interrupt requests IR1, IR2, IR3 and IR4 issued from the interrupt dispatchers 31, 32, 33 and 34, respectively, is the provisional delay condition value PDV.

Next, in operation SOB, a value corresponding to the delay condition threshold value DTV is set in the condition register 12.

In operation SOC, the weight values (for example, W1, W3, and W2) of interrupt requests (for example, IR1, IR3, and IR2) issued during a cycle are input to the delay-condition determining section (adder) 111.

Furthermore, in operation SOD, the weight values (for example, W1, W3, and W2) are summed up by the delay-condition determining section 111.

The result of summing up by the delay-condition determining section 111 is provided to the delay-condition comparing section 112 as the provisional delay condition value PDV. The delay-condition comparing section 112 is provided with the delay condition threshold value DTV from the condition register 12.

In operation SOE, the provisional delay condition value PDV and the delay condition threshold value DTV are compared. That is, if PDV≥DTV, the issued interrupt requests (for example, IR1, IR3, and IR2) are sent together to the processor 2 (see sign A in FIG. 7).

In other words, a signal of a high level "1" is supplied from the delay-condition comparing section 112 to the AND gates 1141, 1142, 1143 and 1144 in FIG. 6, so that all the issued interrupt requests (for example, IR1, IR2 and IR3) are sent together to the processor 2.

On the other hand, if PDV<DTV, the operation returns to operation SOC (see sign B in FIG. 7), where the delay control unit 11 waits for input of another interrupt request, and repeats the above-described operations SOD and SOE.

In other words, a signal of a low level "0" is supplied from the delay-condition comparing section 112 to the AND gates 1141 to 1144 in FIG. 6, so that all the interrupt requests are delay without being sent to the processor 2.

It is needless to say that the process by the delay limit counter 115 may also be performed, as described above.

In other words, the process of sending all issued interrupt requests together when the delay limit counter 115 reaches a predetermined value irrespective of the comparison result by the delay-condition comparing section 112 may be included.

Figure 8:
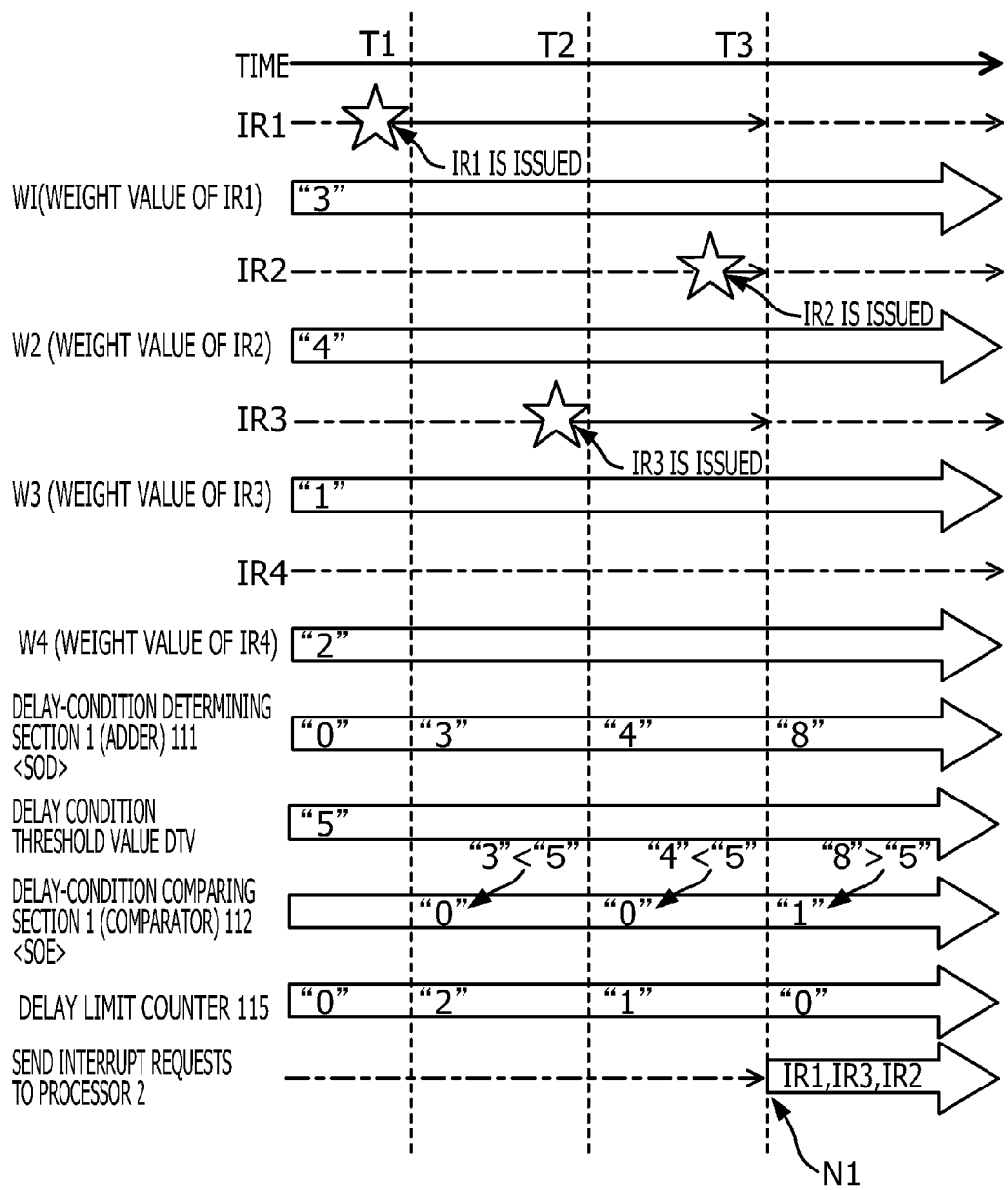
FIG. 8 is a timing chart for describing an example of an operation of the interrupt-notification control unit of an embodiment.

FIG. 8 is a timing chart for describing an example of the operation of the interrupt controller 1 of an embodiment.

In the example of FIG. 8, the interrupt request IR1 is issued from the interrupt dispatcher 31 at time T1, the interrupt request IR3 is issued from the interrupt dispatcher 33 at time T2, and the interrupt request IR2 is issued from the interrupt dispatcher 32 at time T3.

Here, the weight values W1, W2 and W3 of interrupt requests IR1, IR2 and IR3 issued from the individual interrupt dispatchers 31, 32 33, respectively, are set as follows; the weight value W1 of the interrupt request IR1 is set to 3, the weight value W3 of the interrupt request IR3 is set to 1, and the weight value W2 of the interrupt request IR2 is set to 4.

In the condition register 12, a delay condition threshold value DTV of 5 is set. The weight value W4 of the interrupt request IR4 from the interrupt dispatcher 34, not issued in the example in FIG. 8, is set to 2.

The weight-value adding operation by the delay-condition determining section 111 in operation SOD in FIG. 7 gives a provisional delay condition value PDV of 3 because only the interrupt request IR1 with a weight value W1 of 3 is issued.

At that time, the comparison by the delay-condition comparing section 112 in operation SOE in FIG. 7 results in PDV(3)<DTV(5) because the delay condition threshold value DTV is 5, and thus the delay control unit 11 waits for another interrupt request (sign B in FIG. 7).

In other words, since PDV<DTV holds, that is, the provisional delay condition value PDV does not exceed the delay condition threshold value DTV, notification of the interrupt request IR1 to the processor 2 is further delayed.

Next, when the interrupt request IR3 with a weight value W3 of 1 is issued at time T2, the weight-value adding process by the delay-condition determining section 111 in operation SOD gives a provisional delay condition value PDV of 4 because W1(3)+W3(1).

At that time, the comparison by the delay-condition comparing section 112 in operation SOE results in PDV(4)<DTV (5), and thus the delay control unit 11 waits for another interrupt request (sign B in FIG. 7) as at time T1 (sign B in FIG. 7).

In other words, since PDV<DTV holds, that is, the provisional delay condition value PDV does not exceed the delay condition threshold value DTV, notification of the interrupt requests IR1 and IR3 to the processor 2 is further delayed.

When the interrupt request IR4 with a weight value W2 of 4 is issued at time T3, the weight-value adding process by the delay-condition determining section 111 in operation SOD results in a provisional delay condition value PDV of 8 because W1(3)+W3(1)+W2(4).

At that time, the comparison by the delay-condition comparing section 112 in operation SOE results in PDV(8)≥DTV (5), and thus the issued interrupt requests IR1, IR3, and IR2 are sent together to the processor 2, as indicated by reference sign N1 (see sign A in FIG. 7).

In other words, since PDV≥DTV holds, that is, the provisional delay condition value PDV has exceeded the delay condition threshold value DTV, the delayed interrupt requests IR1 and IR3 and the interrupt request IR2 issued from the interrupt dispatcher 32 are sent together to the processor 2.

Thus, the processor 2 handles the interrupt requests IR1, IR3, and IR2 sent together from the interrupt controller 1 one by one.

In the example of FIG. 8, a delay limit counter 115 with a start value of 2 is also provided, and handling by the delay limit counter 115 is also illustrated.

That is, the delay limit counter 115 decreases count values one by one into 0 from time T1 to T3 after an elapse of a predetermined time, the delay limit counter 115 sends issued interrupt requests together to the processor 2.

Accordingly, in the example of FIG. 8, the issued interrupt requests IR1, IR3, and IR2 are sent together to the processor 2 at time T3(N1) as the results of comparison by the delay-condition comparing section 112 and the delay limiting process by the delay limit counter 115.

Figure 2:
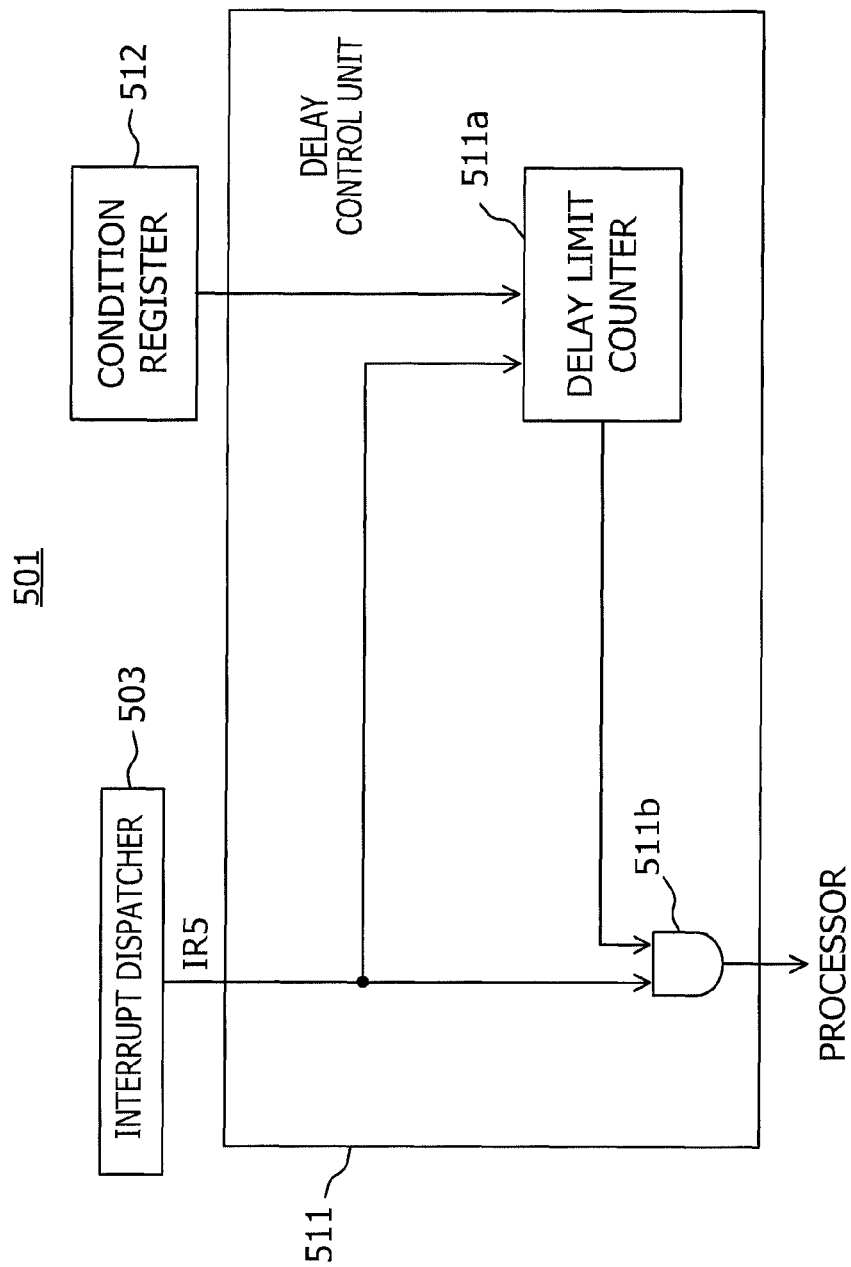
FIG. 2 is a conceptual block diagram of a delay control unit in the interrupt-notification control unit in FIG. 1.

Thus, according to an embodiment, the starting/stopping process of the interrupt handler, which needed three times in the interrupt controller 501 described with reference to FIGS. 2 and 3 may be reduced to one time, thus allowing the overhead associated with the interrupt handling to be reduced.

Figure 9:
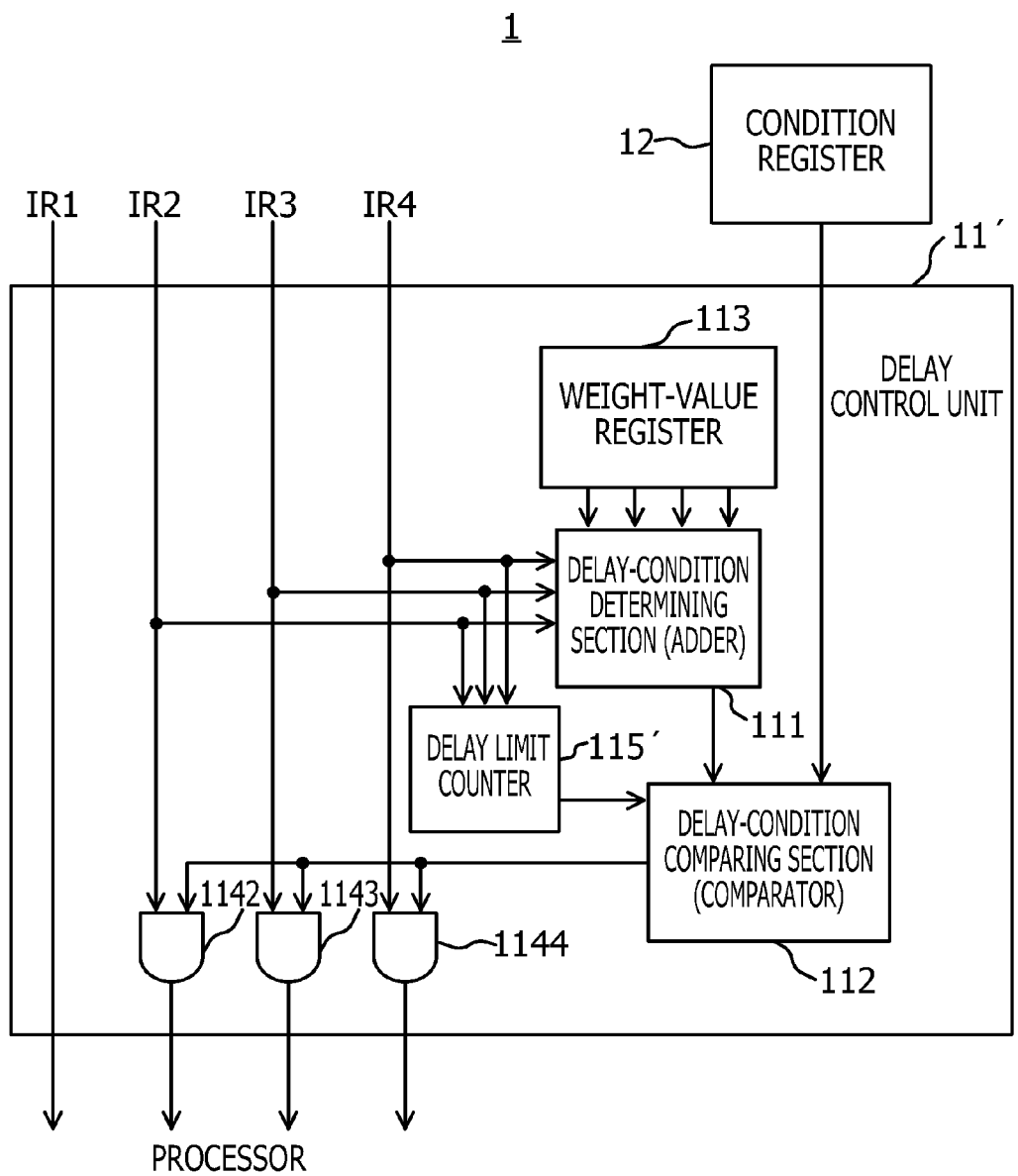
FIG. 9 is a schematic block diagram of an interrupt-notification control unit according to an embodiment.

FIG. 9 is a schematic block diagram of an interrupt-notification control unit according to an embodiment.

A delay limit counter 115' of this embodiment is different from the delay limit counter 115 of the above-described embodiment including in that it sends interrupt requests issued from interrupt dispatchers together to the processor 2 when the number of the interrupt requests reaches a predetermined number.

In other words, the delay limit counter 115 of the embodiment illustrated in FIG. 6 counts the time elapsed from reception of the first interrupt request, while the delay limit counter 115' of an embodiment counts the number of interrupt requests.

When the number of interrupt requests received has reached a predetermined number, the delay limit counter 115' sends the interrupt requests together to the processor 2.

Furthermore, as is apparent from comparison between FIG. 9 and FIG. 6, a delay control unit 11' in the interrupt-notification control unit 1 of an embodiment provides, for example, the interrupt request IR1 from the interrupt dispatcher 31 directly to the processor 2.

In other words, for example, if the interrupt request IR1 from the interrupt dispatcher 31 has very high priority (a degree of emergency), it is immediately sent to the processor 2, and interrupt handling is performed.

Thus, the above embodiment(s) may be modified as appropriate in consideration of priority levels of interrupt requests from interrupt dispatchers and corresponding degrees of emergency of handling. According to an embodiment, value (s) which take into account a currently determined condition may be used for controlling the interrupt requests.

Figure 10:
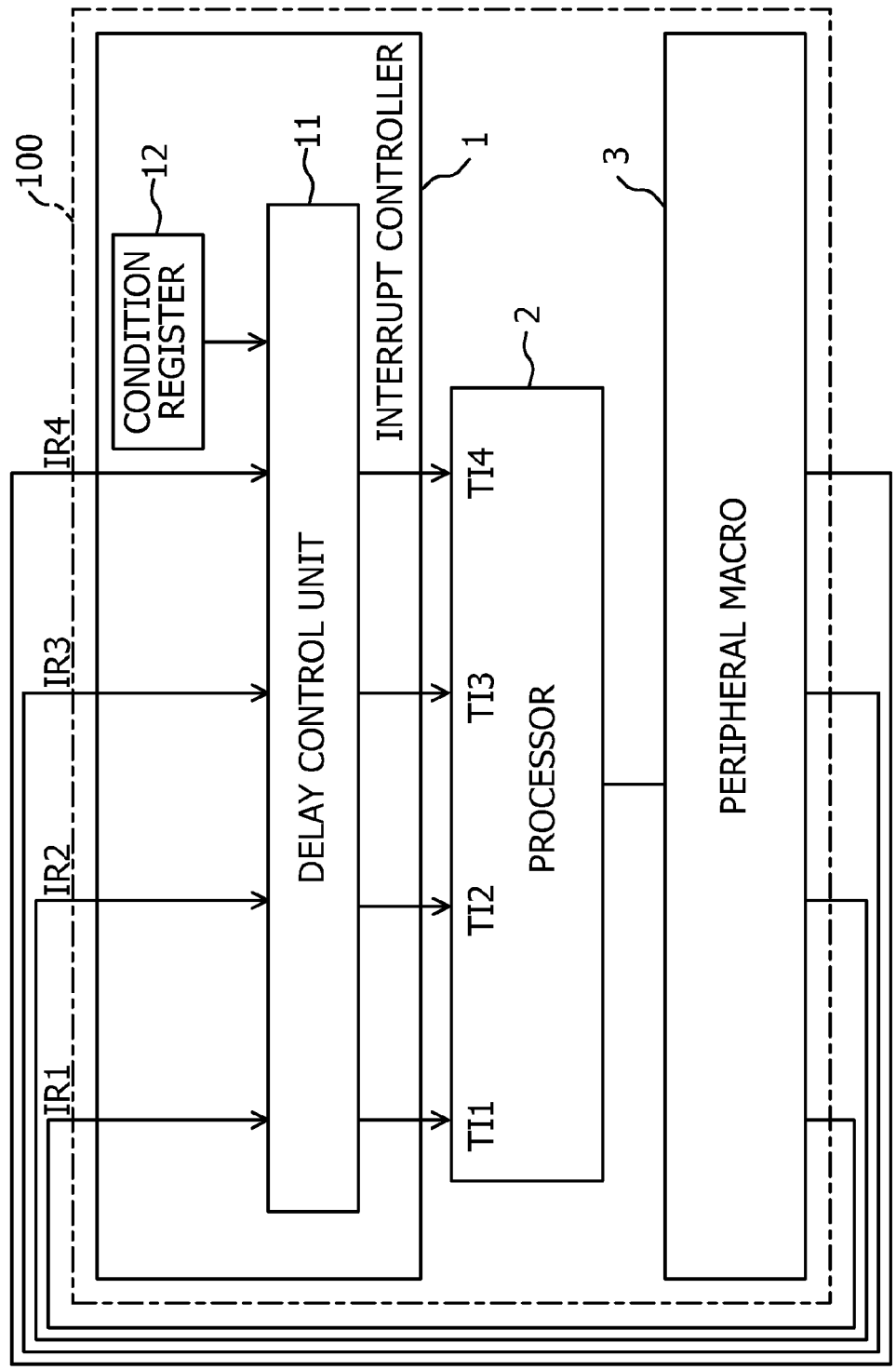
FIG. 10 is a schematic block diagram of an example of a semiconductor integrated circuit incorporating an embodiment.

FIG. 10 is a schematic block diagram of an example of a semiconductor integrated circuit incorporating an embodiment.

As illustrated in FIG. 10, a semiconductor integrated circuit 100 incorporating an embodiment includes the interrupt-notification control unit (interrupt controller) 1, the processor 2, and a peripheral macro 3 connected to the processor 2.

The peripheral macro 3 varies depending on a system in which the semiconductor integrated circuit 100 is used; for example, a memory circuit, such as a RAM, a buffer circuit, a bus circuit, or an I/O circuit.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention, the scope of which is defined in the claims and their equivalents.

What is claimed is:

1. An interrupt-notification control unit that receives interrupt requests from a plurality of interrupt dispatchers and sends the received interrupt requests together to a processor comprising:
   a plurality of logic circuits, each being provided for each of the plurality of interrupt dispatchers, the interrupt-notification control unit determining a correlation among the received interrupt requests from the plurality of interrupt dispatchers and supplies a signal indicating a time to send the interrupt requests collectively to the processor, and
   a delay control unit that controls a delay in the time to send the interrupt requests together to the processor based on priority levels of individual interrupt requests; and
   a condition register that stores conditions for the delay control unit to determine the delay in the time to send the interrupt requests, and
   wherein the plurality of logic circuits send a corresponding interrupt request to the processor at the time.

2. The interrupt-notification control unit according to claim 1, wherein the delay control unit calculates weight values based on the priority levels of the individual interrupt requests and compares the weight values with a threshold value stored in the condition register to control the delay in the time to send the interrupt requests.

3. The interrupt-notification control unit according to claim 2, wherein
   the delay control unit comprises:
      a weight-value register that stores weight values to be given to the individual interrupt requests from the plurality of interrupt dispatchers;
      a delay-condition determining section that calculates the weight values given to the received interrupt requests to obtain a provisional delay condition value; and
      a delay-condition comparing section that compares the provisional delay condition value with a delay condition threshold value that is the threshold value stored in the condition register, and
   wherein when the delay-condition comparing section determines that the provisional delay condition value is larger than the delay condition threshold value, the delay control unit sends the received interrupt requests together to the processor.

4. The interrupt-notification control unit according to claim 3, wherein the delay-condition determining section is an adder that calculates the provisional delay condition value by adding the weight values given to the received interrupt requests; and
   the delay-condition comparing section is a comparator that compares the provisional delay condition value and the delay condition threshold value.

5. The interrupt-notification control unit according to claim 3, wherein the delay control unit includes a delay limit counter, and when the delay limit counter reaches a predetermined value, the delay control unit sends the received interrupt requests together to the processor irrespective of a comparison result by the comparator.

6. The interrupt-notification control unit according to claim 5, wherein the delay limit counter counts for a predetermined time, and when the predetermine time has passed after a first interrupt request from the plurality of interrupt dispatchers is received, the delay control unit sends the received interrupt requests together to the processor.

7. The interrupt-notification control unit according to claim 5, wherein the delay limit counter counts a number of the received interrupt requests, and when the number of the received interrupt request has reached a predetermined number, the delay control unit sends the received interrupt requests together to the processor.

8. The interrupt-notification control unit according to claim 1, wherein an interrupt request from at least one of the plurality of interrupt dispatchers is directly sent to the processor without passing through the delay control unit.

9. A semiconductor integrated circuit comprising:
   a processor;
   an interrupt-notification control unit that receives interrupt requests from a plurality of interrupt dispatchers and sends the received interrupt requests collectively to the processor;
   a peripheral macro connected with the processor;
   a delay control unit that controls a delay in a time to send the interrupt requests together to the processor based on priority levels of individual interrupt requests, and a condition register that stores conditions for the delay control unit to determine the delay in the time to send the interrupt requests, and
   wherein the interrupt-notification control unit includes a plurality of logic circuits, each being provided for each of the plurality of the interrupt dispatchers, determines a correlation among the interrupt requests from the plurality of interrupt dispatchers and supplies a signal indicating the time to send the interrupt requests collectively to the processor, and
   wherein the plurality of logic circuits send a corresponding interrupt request to the processor at the time.

10. A method of controlling interrupt requests from a plurality of interrupt dispatchers, comprising:
    receiving a respective interrupt request from each of the plurality of interrupt dispatchers;

aggregating a plurality of interrupt requests based on a determination of whether the interrupt requests match a condition; and transmitting the aggregated interrupt requests collectively to a processor from a plurality of logic circuits that are each provided for each of the plurality of interrupt dispatchers in accordance with a signal indicating a time to send the interrupt requests and, where the plurality of logic circuits receive a determination that indicates the condition is met by the aggregated interrupt requests when a provisional delay condition value obtained by adding weight values corresponding to priority levels of the plurality of interrupt requests exceeds a delay condition threshold value.

11. The method according to claim 10, wherein said aggregating is adjusted based on priority levels assigned to the interrupt requests.

12. The interrupt-notification control unit according to claim 3, wherein the plurality of logic circuits send the corresponding interrupt request to the processor based on a signal which is output when the provisional delay condition value exceeds the delay condition threshold value.

13. The interrupt-notification control unit according to claim 1, wherein the time is when a provisional delay condition value obtained by adding weight values corresponding to priority levels of the interrupt requests exceeds a delay condition threshold value.

14. The semiconductor integrated circuit according to claim 9, wherein the time is when a provisional delay condition value obtained by adding weight values corresponding to priority levels of the interrupt requests exceeds a delay condition threshold value.

* * * * *